(12) United States Patent
Cooney

(10) Patent No.: US 7,067,003 B2
(45) Date of Patent: Jun. 27, 2006

(54) USE OF DUNDER IN CONCRETE COMPOSITIONS

(75) Inventor: David Patrick Cooney, Graceville (AU)

(73) Assignee: Olmway Pty Ltd, Queensland (AU)

( * ) Notice: Subject to any disclaimer, the term of this patent is extended or adjusted under 35 U.S.C. 154(b) by 0 days.

(21) Appl. No.: 10/514,927

(22) PCT Filed: May 14, 2003

(86) PCT No.: PCT/AU03/00578

§ 371 (c)(1),
(2), (4) Date: Nov. 12, 2004

(87) PCT Pub. No.: WO03/097554

PCT Pub. Date: Nov. 27, 2003

(65) Prior Publication Data

US 2005/0172866 A1    Aug. 11, 2005

(30) Foreign Application Priority Data

May 15, 2002  (AU) .................................... PS2329

(51) Int. Cl.
  *C04B 14/00*   (2006.01)
  *C04B 7/00*    (2006.01)
  *C04B 24/00*   (2006.01)
  *C04B 24/10*   (2006.01)

(52) U.S. Cl. ...................... 106/802; 106/823; 106/738; 106/817; 106/724; 106/729; 106/804

(58) Field of Classification Search ................ 106/802, 106/823, 738, 817, 724, 729, 804
See application file for complete search history.

(56) References Cited

FOREIGN PATENT DOCUMENTS

GB    280116    * 11/1927

OTHER PUBLICATIONS

National Energy Policy Office Final Report, Thailand Biomass-Based Power Generation and Cogeneration Within Small Rural Industries, Nov. 2000.*

* cited by examiner

*Primary Examiner*—Elizabeth D. Wood
(74) *Attorney, Agent, or Firm*—Abelman, Frayne & Schwab

(57) ABSTRACT

A cementitious mixture for concrete including an admixture including dunder having a solids content in a range of from 5% to substantially 100% by weight, the dunder being added to the cement in a range of from 0.1% to 5% by weight of cement in a concentration which results in the initial setting time being less than thirty-six hours.

17 Claims, No Drawings

USE OF DUNDER IN CONCRETE COMPOSITIONS

FIELD OF INVENTION

THIS INVENTION relates to an admixture for cementitious mixtures and to a method of forming cementitious mixtures.

The present invention has particular application to admixtures for reducing the water requirement, extending the setting time, and/or improving the properties of cementitious mixtures in the fresh or "plastic" and hardened states.

BACKGROUND ART

Admixtures have been added to cementitious mixtures to improve their properties. Better flow characteristics of the cementitious mixtures prior to setting increases density of the casting, reducing undesirable voids, and reducing the water requirement increases the strength of the concrete. Delaying the setting time is also desirable in some circumstances, particularly in warmer climates.

Lignin and/or lignin related compounds have traditionally been used as admixtures for cementitious mixtures. However, lignin has recently become quite expensive, and is in short supply. Other substitutes have been tried, but have been found not to perform as required, and/or not been cost effective. Substitutes can be, and often are, added to lignin based admixtures, but this practice, though extending the lignin base, results in less than maximum improvement obtained with unadulterated lignin based admixtures and/or is expensive. Molasses is often or sometimes used as a substitute for lignin. However, it is generally accepted that molasses does not perform as required by itself and is not suitable itself as a water reducing admixture to cementitious mixtures. Against this background, it has been surprisingly found that dunder performs adequately as an admixture for cementitious mixtures, and if modified in accordance with the invention described hereinafter, obtains equal or superior results when compared with ordinary lignin. In this specification, unless the context requires otherwise, dunder includes any residuum obtained after distillation of molasses or sugar product such as vinasse and the like. In this specification, unless the context requires otherwise, the terms "cementitious mixture" and "concrete" are taken to include concrete, shotcrete, mortars, grouts and similar cementitious compounds including mine tailing (backfill). Generally, the term cement refers to a compound which is soft when first prepared but sets or hardens. In the case of cementitious mixtures, cement becomes plastic after the addition of water, after which the mixture sets. In this specification, unless the context requires otherwise, the term "cementitious mixture" refers to the workable liquid which can solidify to form mortar or concrete. In this specification, the term "Portland cementitious mixture" refers to a combination of cementitious materials which consist of the active ingredients and binders and to which sand, aggregate and/or other additives may be added with water to form a cement paste, mortar or concrete.

The present invention aims to provide an admixture for cementitious mixtures, and a method of forming cementitious mixtures, which alleviate at least one of the shortcomings of the prior art, or at least to provide an alternative to currently used admixtures for cementitious mixtures. Other aims and advantages of the invention may become apparent from the following description.

DISCLOSURE OF THE INVENTION

With the foregoing in view, the present invention resides broadly in an admixture formulation for cementitious mixtures including dunder having a solids content in a range of from 5% to 100% by weight.

In another aspect, the present invention resides broadly in a cementitious mixture for concrete, said cementitious mixture including an admixture including dunder, said dunder having a solids content in a range of from 5% to 100% by weight, and said dunder being added to the cement in a range of from 0.1% to 5% by weight of cement in a concentration at which the initial setting time is less than thirty-six hours.

Preferably, the limit of addition of dunder is selected such that the initial setting time is less than twenty-four hours. More preferably, the limit of addition of dunder is selected similar to that of a standard lignin such that the initial setting time is less than nine hours.

It will be appreciated that solids content equates to a measurement on the Brix Scale and also to specific gravity, which can usually be more easily measured. Accordingly, these alternative units converted to solids content may be used and the invention extends to dunder having equivalent brix or specific gravity.

The acidity of the dunder may be modified, if so required, typically to be within the pH range of from 3 to 7 for use in cementitious mixtures. If desired, further additives may be added to or combined with dunder to adjust the retardation of setting time and provide a more stable solution, such as, but not limited to, caustic soda.

In another aspect, the present invention resides broadly in a method of forming cementitious mixtures including:

forming a dry mix from Portland cementitious binders, aggregate and/or sand;

combining the dry mix with an amount of water sufficient to form an aqueous phase; and adding dunder during or after the formation of the aqueous phase to achieve a slump value in the range of 0 mm to 275 mm.

If required, more water may be added to the mixture to achieve the aforementioned range of slump values.

Preferably, the moisture content of the dunder is reduced as described herein. If desired, the acidity of the dunder may be adjusted by the addition of alkali such as, for example, caustic soda or an equivalent.

Preferably, the solids content of the dunder is increased by evaporation or spray drying, although alternative forms of drying may be employed, such as, for example, freeze drying, or the like to improve the storage, handling, and subsequent performance of the dunder admixtures.

BRIEF DESCRIPTION OF THE EXAMPLES

In order that the invention may be more readily understood and put into practical effect, reference will now be made to three examples which illustrate the invention in one or more preferred forms, and wherein:

Example 1 illustrates the water reducing effect of the admixture of dunder according to the invention;

Example 2 illustrates schematically the performance of a range of several cementitious mixtures according to the invention against a control cementitious mixture; and Example 3 illustrates schematically the use of dunder at a range of admixture dosages in cementitious mixtures according to the invention in comparison with untreated mixtures and mixtures according to the prior art.

DETAILED DESCRIPTION OF THE EXAMPLES

Example 1

A control concrete mix was prepared by weighing and combining the following components in a free fall drum mixer to form a control dry cement mix:

| | |
|---|---|
| Portland cement | 380 kg |
| fine aggregate | 760 kg |
| course aggregate | 950 kg |

Water was weighed, added to and mixed with the control dry concrete mix until uniform in workability and colour and until a slump value, by measurement, of 150 mm was obtained. The total water requirement was found to be 215 kg for the control concrete mix (the "control water requirement") at that slump value.

From the above amounts, the water/cement ratio was determined to be 0.566 by dividing 215 kg by 380 kg. The ratio of materials by weight of cement was calculated to be 1.0:2.0:2.5:0.566. The sum of the ratios was therefore 6.066. The plastic density of the control cement mix was determined to be 2,305 kg/m$^3$. The density divided by the sum of ratios was 2,305/6.066 or:

| | |
|---|---|
| Portland cement | 380 kg |
| fine aggregate | 760 kg |
| course aggregate | 950 kg |
| water | 215 kg |
| total | 2,305 kg |

A test concrete mix was prepared using the same quantities of Portland cement, fine aggregate and course aggregate as in the case of the control cement mix to form a test dry concrete mix. Dunder, having a density of 13.7 brix and a specific gravity of about 1.05, was added to the test dry cement mix at a rate of 1.75 kg of dunder per 100 kg of cement after about 80% of the control water requirement had been added with further amounts of measured water added until a slump value, by measurement, of 150 mm was obtained. The total water requirement including the water contained in the dunder and any further amounts of measured water added after the addition of the dunder, and therefore added to the total water used, was weighed at 200 kg.

From the above amounts, the water/cement ratio was determined to be 0.526 by dividing 200 kg by 380 kg. The ratio of materials by weight of cement was calculated to be 1.0:2.0:2.5:0.526. The sum of the ratios was therefore 6.026. The plastic density of the control cement mix was determined to be 2,290 kg/m$^3$. The density divided by the sum of ratios was 2,290/6.026 or:

| | |
|---|---|
| Portland cement | 380 kg |
| fine aggregate | 760 kg |
| course aggregate | 950 kg |
| water | 200 kg |
| total | 2,290 kg |

In this example, therefore, the water reduction due to the addition of dunder was 7.5% (200 kg+215 kg).

It has been found that higher values of water reduction can be obtained with up to, for example, 11.5% water reduction using dunder evaporated to a higher solids content.

Example 2

For comparison purposes, three cementitious mixtures (options 1, 2 and 3) were compared with a control cementitious mixture and the results tabulated as follows:

| | Control | Option 1 | Option 2 | Option 3 |
|---|---|---|---|---|
| Cement (kg/m$^3$) | 400 | 400 | 373 | 400 |
| Coarse aggregate (kg/m$^3$) | 985 | 1010 | 1023 | 985 |
| Fine aggergate (kg/m$^3$) | 715 | 733 | 743 | 715 |
| Water (kg/m$^3$) | 210 | 188 | 187 | 204 |
| Dunder at 13.7 brix (kg/m$^3$) | Nil | 7 | 6.5 | 7 |
| Water/Cement ratio (including water in dunder) | 0.52 | 0.48 | 0.52 | 0.52 |
| Slump (mm) | 100 | 100 | 100 | 150 |
| Compression strength (MPa) | | | | |
| 1 day | 10.5 | 11.0 | 11.5 | 11.5 |
| 3 days | 23 | 26 | 22.5 | 23 |
| 7 days | 35 | 39 | 36.5 | 36 |
| 28 days | 42.5 | 47.5 | 43 | 42 |

Example 3

A trial concrete mix was prepared and various types of admixture and admixture doses were added to provide the result as follows:

| Trial concrete mix | water reduction percent*** | hours to initial set (approx) | hours to final set (approx) | Remarks |
|---|---|---|---|---|
| 1$^{st}$ control mix - untreated | 0 | 3+ | 5+ | |
| 2$^{nd}$ control mix, benchmark lignin* | 12 | 6+ | 7+ | |
| Dunder at equivalent dosage | 13 | 8+ | 10+ | |
| Dunder at 1.5 × equivalent dosage | 18 | 12+ | 13+ | |
| Dunder at 2.0 × equivalent dosage | 23 | 19+ | 21–22 | Extended retardation - higher strength after stiffening**** |
| Dunder at 2.5 × equivalent dosage | 24 | 18–19 | 21–22 | Extended retardation - higher strength after stiffening**** |
| Dunder at 3.0 × equivalent dosage | 25 | 24–25 | 27–28 | Extended retardation - higher strength after stiffening**** |

*Benchmark lignin added at 0.5% of liquor (approximately 35% solids) by weight of cement. Commercial lignin source for use in concrete and mortar mixtures used in tests.
** Dunder added at 0.5% of liquor (approximately 35% solids) by weight of cement.

-continued

| Trial concrete mix | water reduction percent*** | hours to initial set (approx) | hours to final set (approx) | Remarks |
|---|---|---|---|---|

***Water reduction was calculated by dividing water demand of treated mixes by water demand of untreated control mix.
****All dunder mixes gained strength satisfactorily after initial retardation and had superior strength when compared to untreated control mix at all ages from and including 3 days.

The results indicate that evaporated dunder has superior performance to dunder at normal consistency, as stored in sugar processing plants (e.g. at 13.7 brix) based on comparative data from trials. Extended retardation effects can be reduced by the addition of other materials or blending with non-retarding admixtures. Performance limits for dunder under various parameters set forth in this specification may be expanded to subjective economic limits, but other technical limitations may emerge from further research.

From the above, it may be seen that dunder may be used as an alternative admixture in concrete mixes providing similar improvements to the concrete mixes to those provided by lignin. Additionally, it is believed that dunder also provides a reduced material cost for cement admixtures.

Although the invention has been described with reference to one or more specific examples, it will be appreciated by those skilled in the art that the invention may be embodied in other forms within the broad scope and ambit of the invention as defined by the following claims.

The invention claimed is:

1. A cementitious mixture for concrete, said cementitious mixture comprising cement and one or more admixtures, said one or more admixtures including dunder, said dunder having a solids content in a range of from 5% to substantially 100% by weight, and said dunder being added to the cement in a range of from 0.1% to 5% by weight of cement.

2. A cementitious mixture according to claim 1, wherein the concentration of said dunder is selected such that the initial setting time of the cementitious mixture is less than thirty-six hours.

3. A cementitious mixture according to claim 2, wherein the concentration of said dunder is selected such that the initial setting time of the cementitious mixture is less than nine hours.

4. A cementitious mixture according to claim 1, wherein the acidity of the dunder is modified if so required to be within the pH range of from 3 to 7.

5. A cementitious mixture according to claim 1, wherein one or more additives are added to or combined with dunder to adjust the retardation of setting time and provide a more stable solution of dunder.

6. A cementitious mixture according to claim 5, wherein one of the additives includes caustic soda.

7. A method of forming cementitious mixtures including:
   forming a dry mix from Portland cementitious binders, aggregate and/or sand;
   combining the dry mix with an amount of water sufficient to form an aqueous phase in the mixture; and
   adding dunder during or after the formation of the aqueous phase to achieve a slump value of the cementitious mixture in the range of 0 mm to 275 mm.

8. A method according to claim 7, including adding water to the mixture to achieve said range of slump values.

9. A method according to claim 7, wherein the moisture content of the dunder is reduced.

10. A method according to claim 7, wherein the acidity of the dunder is reduced by the addition of alkali.

11. A method according to claim 7, wherein the solids content of the dunder is increased by a drying process.

12. A method according to claim 8, wherein the acidity of the dunder is reduced by the addition of alkali.

13. A method according to claim 8, wherein the solids content of the dunder is increased by a drying process.

14. A method according to claim 9, wherein the solids content of the dunder is increased by a drying process.

15. A cementitious mixture according to claim 2, wherein the acidity of the dunder is modified if so required to be within the pH range of from 3 to 7.

16. A cementitious mixture according to claim 3, wherein the acidity of the dunder is modified if so required to be within the pH range of from 3 to 7.

17. A cementitious mixture according to claim 1, wherein the concentration of said dunder is selected such that the initial setting time of the cementitious mixture is less than twenty-four hours.

* * * * *